Aug. 29, 1967   A. STOEBER   3,338,605
SUPPORT STRUCTURE

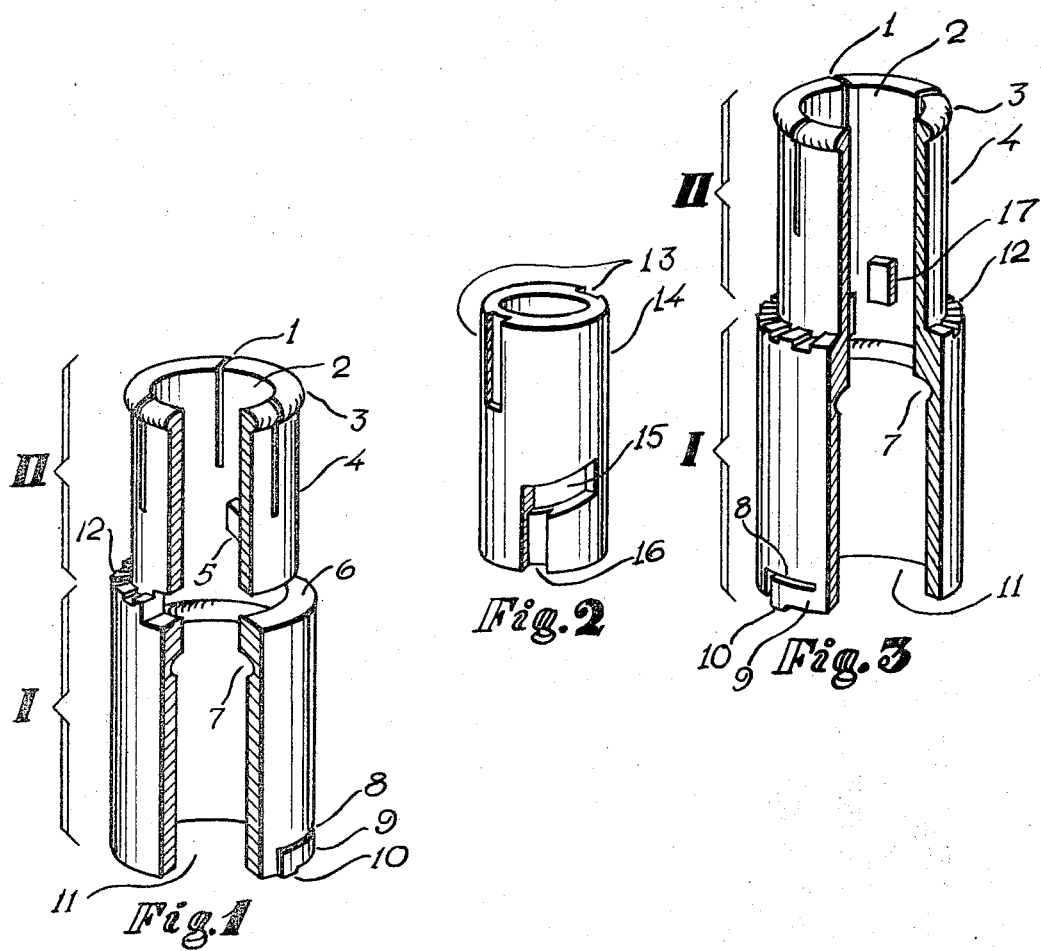

Filed Oct. 5, 1964   4 Sheets-Sheet 2

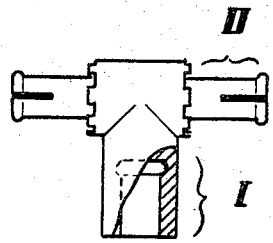
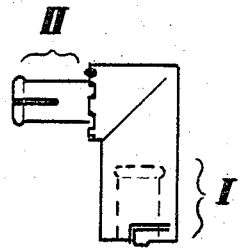
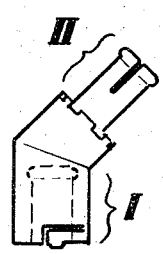
Fig.6     Fig.7     Fig.8
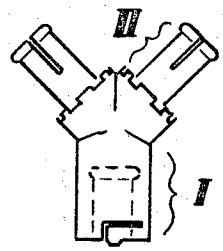
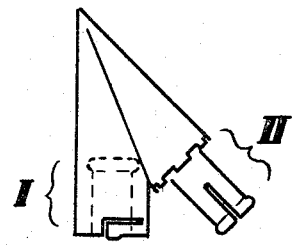
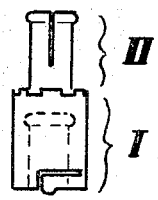
Fig.9     Fig.10     Fig.11
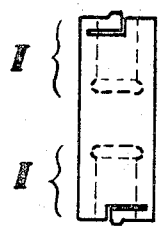
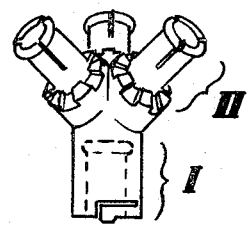
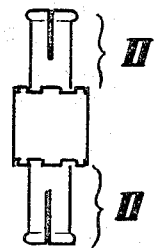
Fig.12     Fig.13     Fig.14
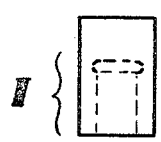
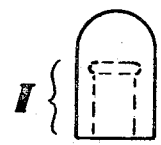
Fig.15     Fig.16

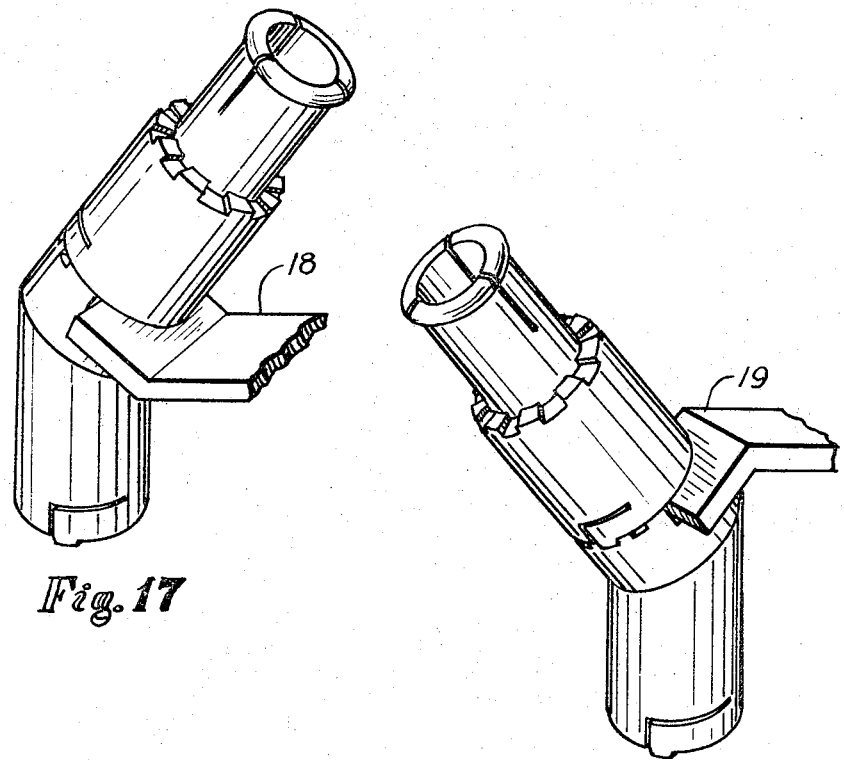
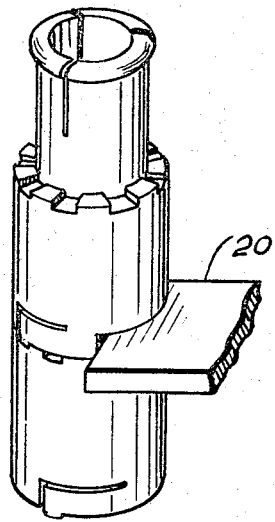

United States Patent Office 3,338,605
Patented Aug. 29, 1967

3,338,605
SUPPORT STRUCTURE
Alfred Stoeber, 62 Caldwell Road, Parsippany-
Troy Hills, N.J. 07054
Filed Oct. 5, 1964, Ser. No. 401,313
13 Claims. (Cl. 287—54)

This invention relates to support structures for racks, shelves, boards and similar articles. More specifically, the invention relates to supports for bookcases, room dividers, display racks, tables and the like.

Knockdown structures which may be changed to fit different needs and space facilities, have been known for a long time. These structures, in addition to the advantage that they may be adapted to fit into the available space, may be shipped easily and occupy very little space when dismantled. Many devices are available on the market for changing the arrangement of bookcases, racks, the number of racks per bookcase, and for changing the distance between the panels or boards to provide for the different height of books and other objects.

Some of the devices known make possible the elimination of some sections of panels, for the purpose of interrupting the uniform arrangement of the horizontal parallel panels, and providing a more attractive appearance.

Generally, the object of the several structures available on the market is not only to provide support for the panels, but to provide attractive furniture, usually of modern lines. Cocktail tables and end pieces may be constructed which consist, for instance, of two or three horizontal boards set at predetermined space relationship. Also, room dividers are known which consist of several boards extending radially from one single bar. As a variation, the boards may be arranged at different angles, not only horizontally, and may connect different bars.

Although many improvements have been made in the construction of knockdown support structures, the devices available on the market still present a few drawbacks. Customarily, in order to provide adequate support, they must be made of steel or other metal, a factor which keeps the cost relatively high. In addition, they require fastening means for the assembly and tools for the disassembly such as glue, pegs, screws, bolts, dowels, nails, hammers, screwdrivers and the like. The labor and time involved in the assembly of the different parts and respective dismantling, are a deterrent to the normal consumer, usually the housewife.

Another disadvantage of the support structures available on the market is that a complete disassembly of the entire unit is required, to remove a single board or to change the position of a single board.

It is an object of this instant invention to provide a support structure which can be made of plastic material, thus keeping the cost of the devices considerably lower than for objects made of steel.

Another object is to provide a structure which, when assembled is rigid, firm, and suitable for support of heavy books and other objects, without the use of fastening means.

Another object is to provide a structure consisting of detachable members, wherein the elements may be easily assembled and disassembled by hand.

Another object is to provide devices which can be easily assembled for any number of boards and one or more boards may be easily removed and added, or positioned at a different angle, without disassembling the entire unit.

Another object of this instant invention is to provide a support structure which can be easily arranged in different shapes, for instance, in the shape of a T or U, whereby the boards may be arranged in direction perpendicular one to the other, or at any angle, or to provide a curved arrangement in addition to the conventional horizontal arrangement, with the boards set parallel one to the other. The angular arrangement is particularly advantageous in the case of tent poles, light fixtures, display racks and the like.

Another object of this instant invention is to provide a structure which may serve as a support not only for planar panels and boards, but for boards having different shapes, arcuated, curved and of angular shape.

The crux of the instant invention resides in the combination of three members suitable for interlocking engagement, and yet, easily detachable among themselves.

By reference to the drawings, FIGURE 1 represents the first element A in its upright or erected position, in perspective. Part of the figure is broken away to show the inner construction.

FIGURE 2 represents the second element B, also in its upright position, in perspective.

FIGURE 3 represents the third element C, in its upright position, in perspective. Part of this figure is broken away to show the inner construction of this element.

FIGURES 6 to 14 show different embodiment of members A and C, whereby these members form angular arrangements, different from the upright position or embodiment of FIGURES 1 and 3.

FIGURES 15 and 16 show two variations which may be used at the two terminal ends of the support structure, mainly for decorative purposes.

FIGURES 17, 18 and 19 show different embodiments of the invention where three members A, B and C are assembled, and a board is held firmly in place.

Figure 4B:
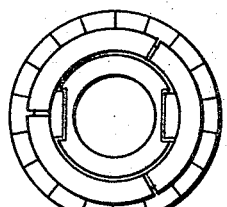
FIGURE 4A is a cross-sectional view of the three members in working assembly. Top and bottom views are also shown in FIG. 4B and FIG. 4, respectively.
Figure 5B:
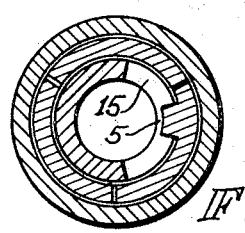
FIGURE 5B is a cross sectional view as seen along line 5B—5B of FIG. 5A.
Figure 4A:
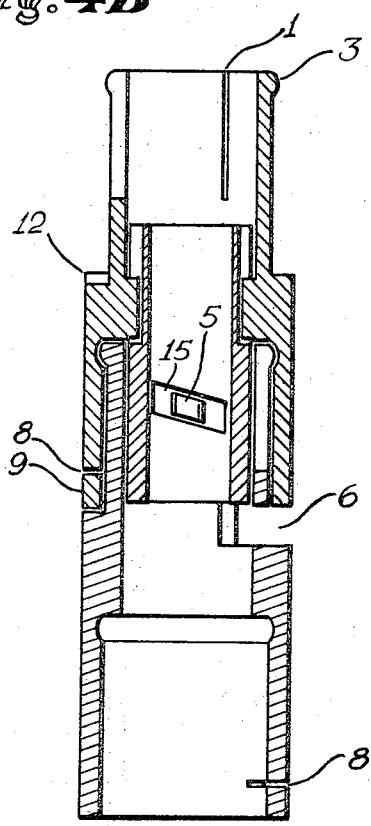
Figure 5A:
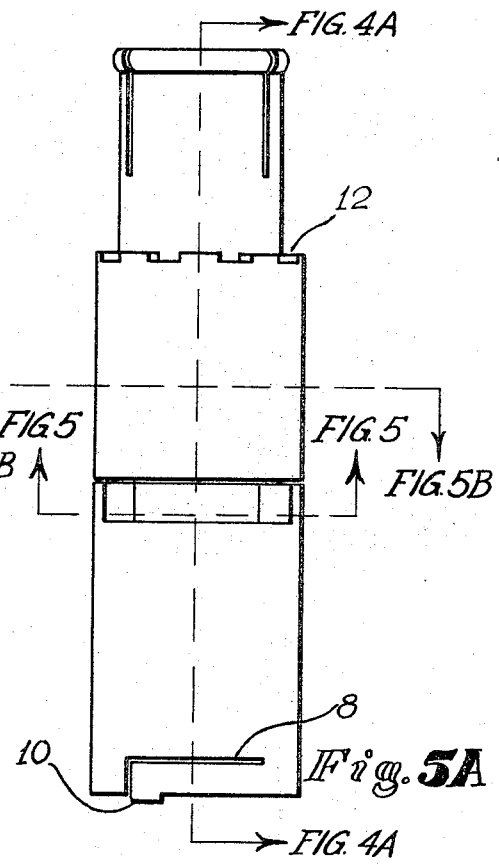
FIGURE 5A is an elevational view of the three members also in working assembly.

Referring to FIGURE 1, member A is essentially a hollowed member having in its inner cavity a projecting lug shown at 5, integral therewith. Although the size and shape of the lug may be varied, the length must not be greater than one-eighth the overall length of member A, and not smaller than one-twentieth the length of this member. According to the preferred embodiment, the length of the lug 5 is one-twelfth of the length of member A. The width of lug 5 is not greater than one-tenth, and not smaller than one-twentieth the inner circumference of the upper portion of member A.

The thickness of the lug 5 is not less than one-sixth and not over one-third the inner diameter of the upper portion of member A. In the embodiment of FIGURE 1, the lug has a rectangular shape.

Member A is also characterized by a cut-out section shown at 6, which serves as the receptacle for the panel or board to be anchored in the structure, in accordance with this instant invention. This cut-out section manifestedly also serves as a guide for the panel or board to be supported, with the panel or board sliding within and being held firmly in place.

According to the preferred embodiment of the invention, the cut-out section is located transversely, preferably midway between the vertical length of member A, and extends for one-half the overall circumference of member A. Greater support may be achieved if the cut-out portion extends more than one-half of the entire circumference. On the other hand, if the board is to be used only for decorative purposes or as a support for light objects, then a cut-out portion smaller than one-half of the circumference, is sufficient.

The height of the cut-out section shown at 6 may be varied according to the panel or board to be supported, but it should not exceed one-tenth of the overall length of member A. Manifestedly, the height of the cut-out portion 6 may be decreased at will in the case of thin panels which are used merely for decorative purposes.

Although in FIGURE 1, member A is represented as a cylindrical, hollowed member, the exterior appearance may be changed to satisfy different needs of interior decorating, modern furniture as well as antique or other styles. The exterior shape of member A may also be finished with a square or oval, or other shape.

According to the preferred embodiment of the invention, the upper portion of member A above the cut-out section 6, has walls of reduced thickness so that the inner diameter in the upper and lower portion of member A is the same, with the difference in the outer diameter between the upper and lower portion of member A, being due to the difference in the wall size.

The numeral 10 at the base of both members A and C in FIGURES 1 and 3, represents a projection in the shape of a tooth, which is adapted to engage with the channel or notch shown at 12, both in FIGURES 1 and 3. At least one notch 12 and one projecting member or tooth 10 is necessary for interlocking engagement of members A and C. It is preferable, however, to provide both members A and C with a plurality of teeth 10 and a plurality of channels or notches 12, throughout the entire circumference, in space relationship, as indicated in FIGURES 1 and 3.

According to the embodiment shown in FIGURES 1 and 3, both members A and C are provided with both notches 12 and projecting teeth 10 to permit disposition of the different members in series and assembly of more than one unit. The ultimate result when several panels have to be supported is that each member A interlocks with two members C and each member C interlocks with two members A. With respect to the size and shape of the teeth shown at 10, and the channels shown at 12, it is manifest that variations are possible within the scope of the invention, but they must be of such size and shape that the two members A and C may be easily assembled and disassembled, and that when the units are assembled, a snug fit is provided.

Figure 5:
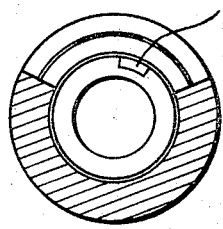
FIGURE 5 is a cross sectional view as seen along line 5—5 of FIG. 5A.

The embodiment shown in the drawings, comprises the projecting teeth 10 and the notches 12 of rectangular shape, as is clearly shown in FIGURE 5. It is to be understood, however, that the notches 12 may be of any other shape, for instance, curved or in the shape of dovetail channels.

Figure 4:
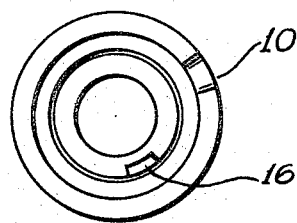

Numeral 8 in both members A and C represents a slot through the entire wall thickness as it is shown in FIGURE 4. According to the best embodiment of the invention, the slot is at right angles. The object of the slot 8 is to provide for greater flexibility during the assembly of the structure and a springing action when the unit is assembled, resulting in a tight fit between the different parts. The numeral 9 represents the portion where the springing action is mainly exerted.

Numeral 1 in FIGURES 1 and 3 represents a vertical split which extends, preferably for about one-half the length of the upper portion of members A and C. It is understood, however, that the split may vary between one-fourth and one-half of the length of the upper portion of members A and C. The slot serves the purpose of slightly squeezing members A and C when the unit is ready for assembly. The springing action provided by the walls adjacent to the split serves to provide better gripping during the operation of assembly of the unit and after the unit is assembled, to provide a tight, firm structure. Although only one split is necessary within the scope of the invention, it is preferable to provide both members A and C with three (3) splits, as indicated in FIGURES 1 and 3. The three splits are preferably disposed at equal distance along the circumference of the upper portion of members A and C.

Numeral 2 represents the inner diameter of members A and C which is the same in both members. Numeral 3 represents an angular collar along the rim of the upper portion of both members A and C. Numeral 7 represents an annular recess or groove in the inner wall of members A and C. The size of collar 3 and groove 7 are so selected that when the unit is assembled, collar 3 engages in interlocking engagement with groove 7 to provide a tight fit. Although section 3 and groove 7 may extend only for a portion of the circumference of members A and C, according to the best embodiment as shown, collar 3 extends throughout the entire circumference and groove 7 extends throughout the inner wall of members A and C.

Numeral 4 represents the outer diameter of members A and C in the upper portion.

FIGURE 2 represents member B which is to be engaged with the first member A. Member B is a tubular member of diameter so selected that when member B is within member A, a snug fit is obtained.

The overall length of member B is considerably smaller than member A, and is so selected that, when it is telescopically mounted within member A in working arrangement, the lower end of member B extends to the mid-point of the cut-out section 6, and the upper end projects over the upper end of member A as shown in FIGURE 4.

Member B comprises in its lower end a vertical groove shown at 16 which continues in an inclined cut-out section shown at 15. The latter extends over one-half of the entire circumference of member B. The size of the groove 16 and the inclined cut-out section 15 are so selected that the inner lug 5 of member A slides therein, and when the unit is assembled a snug fit is provided.

As FIGURE 2 indicates, the vertical groove 16 does not extend through the entire wall of member B, while the inclined cut-out portion 15, which is contiguous with the vertical groove, extends throughout the entire wall of member B.

When the structure is ready for use, member B is telescopically mounted within the first member A, and by turning the two elements with an angular rotation, lug 5 of member A slides within the slot in member B until it is rigidly locked in place. Manifestedly, if a board is positioned into the cut-out portion of member A 6, it will be rigidly clamped without the need of any tools. In this position, with a panel being allowed to slide in the cut-out section 6, member B cannot extend to the mid-point of the cut-out section, but fits snugly in position.

In accordance with this invention, additional clamping effect is provided by a tapering of the wall of the vertical groove 16, as shown more clearly in FIGURE 2, with the greater wall thickness at the upper end, and the lesser thickness at the lower end of groove 16. The tapering amounts to such a difference between the wall thickness of groove 16 at the upper and lower ends that the upper wall is preferably twice the thickness of the lower wall. Different degrees of tapering, however, are possible within the scope of the invention with the lower end ranging in thickness between one-fourth and eight-tenths of the wall thickness at the upper end. Manifestedly, this tapering facilitates the initial entrance of lug 5 into the receptacle 16, and results in a tighter fit when the unit is assembled.

The third member C which interlocks with members A and B is shown in FIGURE 3. To provide better locking mechanism, member B is provided with at least one (1) recess section at the upper end, shown at 13, for locking engagement with member C. This recess 13 extends from the upper end, downwardly, preferably for one-quarter of the overall length of member B. The size and length of the recess 13 may be varied, extending between one-third and one-half the thickness of the wall of member B. The width of the recess is between one-third and one-fourth the circumference of member B. The length of the recess may be varied within the scope of the invention between one-tenth and one-third the overall length of member B.

Although only one recess area 13 is sufficient, within the scope of the invention, according to the best embodiment, two recess areas 13 are provided in member B as shown in FIGURE 2. The function of the recess area 13 will be described below.

As it is shown in FIGURE 3, member C is a tubular member. The inner diameter of member C shown at 2 is sufficiently greater than the outer diameter of member B shown at 14 to permit telescopically mounting of member B within member C and a snug fit. When the unit is assembled, member B is telescopically mounted within member A until the lug 5 is tightly held within the receptacle 15 of member B. Then member C is telescopically mounted over member B.

Member C is provided with at least one projecting lug in the interior cavity of its upper portion, and preferably, two projecting lugs as shown at 17. According to FIGURE 3, the lug 17 has a rectangular shape. It is to be understood, however, that the shape of lug 17 may be varied, provided that when the unit is assembled and when member B is telescopically mounted within member C, by a slight angular rotation, lug 17 fits snugly within the recess 13 to provide a rigidly locked structure.

As FIGURE 3 shows, the upper portion of member C has thicker wall in its lower portion than its upper portion, corresponding to the same difference in wall thickness as between the upper and lower portions of member A. When the unit is assembled, member C is telescopically mounted over member B with the lower portion of thicker wall abutting with the lower portion of member A. Thus, when the unit is assembled, the portions of equal wall thickness of members A and C are contiguous.

Member C may be made of any desirable external appearance, either matching the shape and external appearance of member A or different. When the outer appearance, size and shape of member C match member A, and when the unit is assembled for use, with a panel inserted into the slot 6, an attractive continuous structure results of uniform external shape and dimensions.

FIGURES 6 to 14 show some different embodiments of members A and C, whereby the assembled unit takes different shapes as shown in addition to the vertical unidirectional arrangement of FIGURES 1 through 5. The embodiments of FIGURES 6 to 14 are especially advantageous if panels and boards are to be positioned at different angles rather than horizontally and all parallel to each other. Thus, the embodiments of FIGURES 1 through 14 serve as bushings or connection members between the unidirectional units of the invention which are shown in FIGURES 1 through 5.

It is manifest from the drawings and the above description that this instant invention provides a support structure easy to assemble and disassemble, with one locking mechanism being provided by the engagement of the channels and the teeth in members A and C, as represented by the numerals 10 and 12. The second locking mechanism is provided by the annular collar shown at 3 in FIGURES 1 and 3, engaging with the annular groove as shown at 7.

According to the preferred embodiment shown in the drawings, additional rigidity is provided by the interlocking engagement of the lug in member A and the receptacle in member B as shown by 5, 15 and 16. The split sections in members A and C shown at 1 and 8 provide springing action whereby, when the unit is assembled, the walls adjacent each split section urge against the respective portions of members A and C and give the structure additional rigidity.

The thickness of the board or the like to be anchored within section 6 may be varied within limits, and it must be so chosen that when it is seated therein, and members A and C arranged in interlocking engagement by a turn of the hand, the board remains snugly in place.

Although not part of this invention, a cap may be telescopically mounted over the upper end of member C to harmonize, if desired, with other furniture and the interior decorating theme of the surroundings. FIGURES 15 and 16 show two embodiments of a cap.

While the drawings show only one unit capable of supporting a single panel, it is manifest that several units may be arranged in series so as to constitute an upstanding column, if a plurality of horizontal bars is desired.

The several units may also be arranged in a T shape or U arrangement, so that the boards may be positioned at different angles with respect to the horizontal boards, and also perpendicularly, by means of the connecting members as shown in FIGURES 6 to 14.

FIGURES 17 and 18 show panels of different shape in addition to the horizontal panel of FIGURE 19.

The device of the invention may be made of steel, or of plastic composition, such as polyolefins, styrene-butadiene polymers, acrylic polymers and copolymers. Polymers which may be manufactured by injection molding are especially suitable within the scope of the invention.

It is manifest from the drawings and above description of same that applicant has provided a simple structure, easy to manufacture, which requires no tools in the assembly or the disassembly, which can be economically manufactured and which can be made of any desired external appearance to fit attractive and high-quality furniture.

While some embodiments of my invention have been described in detail for the purpose of illustration thereof, it will be apparent that other adaptations and modifications may be made without departing from the scope of the following claims.

What is claimed is:

1. A three-member support structure for detachably securing a fourth member thereto, comprising separable first, second and third members, said first member having a bore therethrough with a cut-out section in its wall which extends transversely of the wall and extends completely through a portion of said wall of said first member for slidably receiving said fourth member, a second member of lesser diameter than said first member for telescopically mounting within said first member, means for interlocking engagement between said first and second members, said first means comprising a lug on one of said first or second members and a coacting first recess means for said lug on the other of said first or second member, said recess having a portion extending axially from one end of one of the said first or second members and a contiguous portion inclined thereto of an angle less than 90 degrees, second means for interlocking engagement, between said second and third members, when said second and third members are telescopically engaged, said second means comprising at least one lug on one of said second or third members, and at least one coacting recess for said lug on the other of said second or third member, said recess extending axially from the end opposite said first recess means, and third means for interlocking engagement between said first and third members, said third member having a bore therethrough, said third member being of diameter greater than said second member, for telescopically mounting thereon said third means comprising an annular groove on one of said first or third members and a coacting radially extending shoulder for said groove on the other of said first or third members and fourth means to selectively lock said first and third members against relative rotation, whereby when said fourth member is allowed to slide within said cut-out section in said first member, and the first and third members are telescopically mounted over said second member, and said third means are in locking engagement and said lugs and recesses are in engagement and said first and third members are rotated relative to each other said second means rotates said second member and said first means urges said second member into tight clamping engagement with said fourth member and said fourth means locks the members in said clamping engagement.

2. The structure of claim 1, wherein said fourth member is planar.

3. The structure of claim 1 wherein said fourth member is angularly shaped.

4. The structure of claim 1, wherein said three members provide a vertical unidirectional arrangement.

5. The structure of claim 1, wherein said first and third members provide a U shaped arrangement.

6. The structure of claim 1 wherein said first and third members provide a T arrangement.

7. The structure of claim 1, wherein the diameter of said first member is reduced in the portion above said cut-out section, and the diameter of said third member is reduced in its lower portion whereby, when the first member and third member are telescopically mounted over said second member, and interlockably engaged, and a fourth member is anchored in the cut-out section of said first member, an upstanding column results of uniform external dimensions.

8. The structure of claim 1, wherein said first means comprise a lug in said first member and a recess in said second member extending axially and a contiguous inclined portion and the recess which extends axially has tapered walls, the wall thickness being greater at the upper end than at the lower end.

9. The structure of claim 1, wherein the means for interlocking engagement between said first and third members additionally comprise at least one projecting member at the base of one of said first and third members and at least one coacting cut-out portion in the other of said first and third members, whereby when the structure is assembled, said projecting member is in engagement with said cut-out portion.

10. The structure of claim 9 which has a plurality of projecting members and cut-out portions along the entire circumference of said first and third members.

11. The structure of claim 1, wherein said first and third members are axially partially split, whereby a tight fit is obtained when the unit is assembled.

12. The structure according to claim 11, wherein said first and third members are split at predetermined locations in spaced relationships along the circumference thereof.

13. The structure according to claim 1 wherein said first and third members contain a slot in the lower part thereof.

References Cited
UNITED STATES PATENTS

| | | | |
|---|---|---|---|
| 221,442 | 11/1879 | Broome | 285—396 |
| 367,578 | 8/1887 | Babb | 285—397 |
| 413,730 | 10/1889 | Palmer | 287—54 |
| 768,294 | 8/1904 | Oetling | 285—81 X |
| 1,005,145 | 9/1911 | Bicalky | 285—322 |
| 2,646,175 | 7/1953 | Beauvalis et al. | 211—148 |
| 3,160,457 | 12/1964 | Fischer | 285—319 X |

FOREIGN PATENTS

| | | |
|---|---|---|
| 1,130,926 | 10/1956 | France. |
| 1,169,736 | 9/1958 | France. |
| 315,771 | 10/1956 | Switzerland. |
| 322,509 | 7/1957 | Switzerland. |

CARL W. TOMLIN, *Primary Examiner.*

D. W. AROLA, *Assistant Examiner.*